F. PEREZ.
Cultivators.

No. 143,380. Patented September 30, 1873.

Witnesses.
John Becker
Fred Heymes

F. Perez
by his Attorneys
Brown & Allen

UNITED STATES PATENT OFFICE.

FELIPE PEREZ, OF HAVANA, CUBA.

IMPROVEMENT IN CULTIVATORS.

Specification forming part of Letters Patent No. 143,380, dated September 30, 1873; application filed August 4, 1873.

*To all whom it may concern:*

Figure 1:
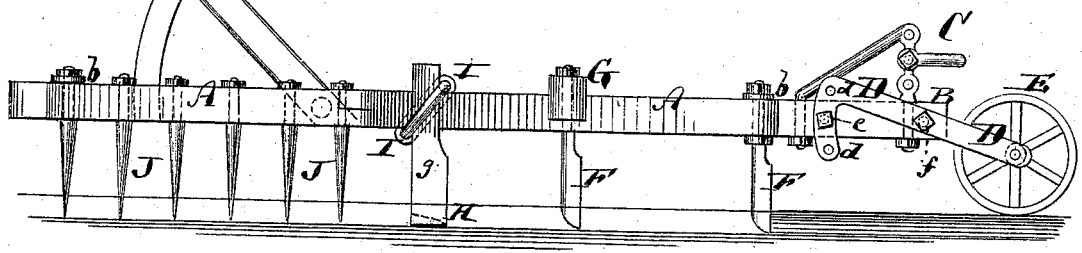
Figure 2:
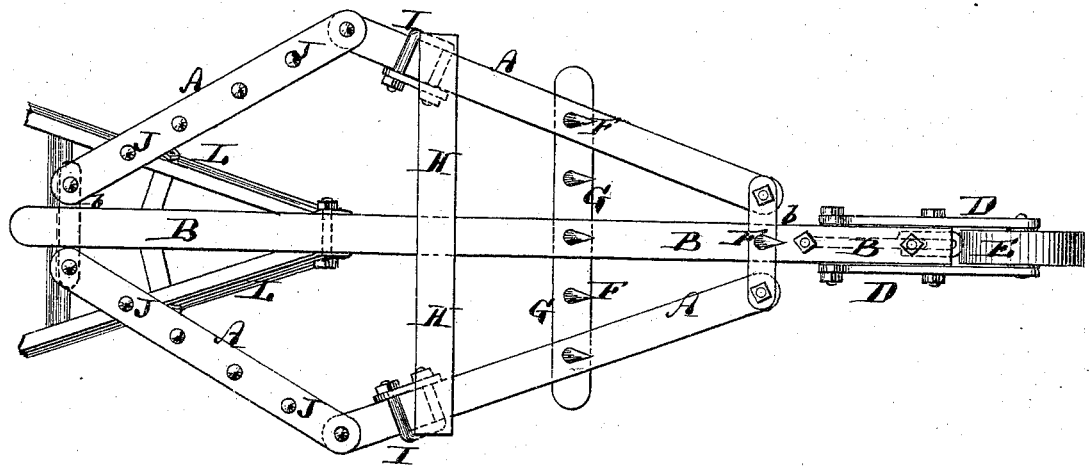

Be it known that I, FELIPE PEREZ, of Havana, in the Island of Cuba, have invented an Improved Cultivator, of which the following is a specification:

Figure 1 is a side elevation of my improved cultivator, and Fig. 2 is a bottom view thereof.

Similar letters of reference indicate corresponding parts in both figures.

This invention has for its object to provide a cultivator for land that is more or less covered with a thin growth of grass or weeds, and that is not to be tilled to a great depth; and the invention consists in the use of a cultivator having a series of cutters in front, whereby the upper crust or vegetable cover of the soil is cut into narrow strips, and which cutters are in front of a transverse horizontal cutting-blade, whereby the crust or cover thus cut into strips is turned to bring the vegetable matter under ground. Behind such transverse blade there are a series of sharply-pointed teeth, which pulverize or rake up the soil and prepare it for the reception of the seed.

In the accompanying drawing, the letter A represents the frame of my improved cultivator. It is by preference in shape of an irregular hexagon—*i. e.*, composed of two pairs of side bars, that are at their front and rear ends connected by transverse strips or bars $b$ $b$. A longitudinal beam, B, extends through the middle of this frame, and carries at its front end the clevis C, to which the draft animals are attached. This clevis is by preference made up and down adjustable, as is indicated in Fig. 1. To the front of the beam B are also pivoted the side bars of a frame, D, in which a caster-wheel, E, is hung. The back parts of this frame D are made with perforations or slots, as at $d$ $d$, and connected with the beam B by a pin or bolt, $e$, as shown.

By this construction the frame D can be swung on its pivot $f$, and then screwed in suitable position by the said bolt $e$, to bring the frame A B nearer to or farther off the ground, and thus to regulate the depth to which the tools of the said frame enter the ground.

In front of the frame are screwed to its under side a series of cutting-blades, F F, which are set at proper distances apart to divide the crust or cover of the soil into a series of narrow strips. These cutters F are screwed tightly to the beam B by extending with their shanks through the same, and by being finally secured by nuts, as shown, and partly to a cross-bar, G, placed over the frame A and fastened thereto, and more or less may also be secured to the front pair of side bars of the frame A. Behind the rear line of the blades F is arranged a transverse horizontal blade, H, which extends beneath the entire width almost of the cultivator-frame, and which has its ends $g$ turned up and fitted between the sides of the frame and the outer parts of inclined clips or clamps I that are placed around the outer sides of the frame A and the standards $g$. Between these clips or clamps the standards can be set higher or lower to bring the tool H to a greater or less depth into the soil. Behind the cutting-blade H are firmly screwed in the back part of the frame A a series of pointed pins or harrow-teeth, J J.

As the cultivator, which for guidance is provided with ordinary handles L, is moved along the cutters enter the ground to the depth to which they are set by the adjustment of the frame D, and cut the upper part of the soil into narrow strips, which are then readily turned over by the blade H that enters beneath them, and that throws the grassy or vegetable part of the soil beneath the earth. Finally, the soil thus turned is raked or pulverized by the teeth J, and thus prepared for planting or seeding.

What I claim as my invention is—

A cultivator composed of a forward supporting-roller, E, of the cutting-blades F F, horizontal transverse blade H, and pointed teeth J J, to operate on light soil, substantially as herein shown and described.

In testimony whereof I have hereunto signed my name before two subscribing witnesses this 11th day of July, 1873.

FELIPE PEREZ.

Witnesses:
 JOS. A. RAPHEL,
 JOS. A. SPRINGER.